United States Patent
Burch et al.

(10) Patent No.: US 6,896,984 B2
(45) Date of Patent: May 24, 2005

(54) METHODS FOR REDUCING MASS AND VOLUME OF A FUEL PROCESSOR

(75) Inventors: Steven D. Burch, Honeoye Falls, NY (US); William H. Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 397 days.

(21) Appl. No.: 10/133,597

(22) Filed: Apr. 26, 2002

(65) Prior Publication Data

US 2003/0203250 A1 Oct. 30, 2003

(51) Int. Cl.$^7$ .............................. H01M 8/06; C01B 3/12; C01B 3/32; B01J 8/04
(52) U.S. Cl. .......................... 429/17; 429/19; 423/650; 423/655; 423/247; 422/190
(58) Field of Search .............................. 429/17, 19, 20, 429/24, 26; 423/650–658.3, 246, 247; 422/168–172, 188–190

(56) References Cited

U.S. PATENT DOCUMENTS

| 5,763,113 | A | 6/1998 | Meltser et al. |
| 6,287,529 | B1 | 9/2001 | Heil et al. |
| 2002/0122965 | A1 | 9/2002 | Yu |
| 2002/0160239 | A1 | 10/2002 | Cutright et al. |
| 2002/0182459 | A1 | 12/2002 | Ingraham et al. |
| 2003/0026747 | A1 | 2/2003 | Zhu et al. |
| 2003/0049505 | A1 | 3/2003 | Kameya et al. |

FOREIGN PATENT DOCUMENTS

| JP | 2001-270702 | 10/2001 |
| JP | 2002-008704 | 1/2002 |
| JP | 2002-291161 | 10/2002 |

OTHER PUBLICATIONS

International Search Report dated Jun. 24, 2003; Int'l Appl. No. PCT/US03/10121, published with WO 03/92108, Nov. 6, 2003.

*Primary Examiner*—Jonathan Crepeau
(74) *Attorney, Agent, or Firm*—Harness, Dickey & Pierce, P.L.C.

(57) ABSTRACT

A method for designing a fuel processor having an optimized size (i.e., volume and mass) for use in a fuel cell system which provides electrical power in a plurality of power ranges. The method includes maximizing water availability in the fuel cell system and sizing the first CO reduction reactor to provide for peak fuel cell system operational efficiency in a most-used power range while sizing the second CO reduction reactor to ensure the fuel processor can components to operate at a desired maximum power. The method allows development of a fuel processor that has significantly lower total mass and volume, and shorter start-up time, than conventionally designed processors, yet can perform at a desired maximum power.

20 Claims, 3 Drawing Sheets

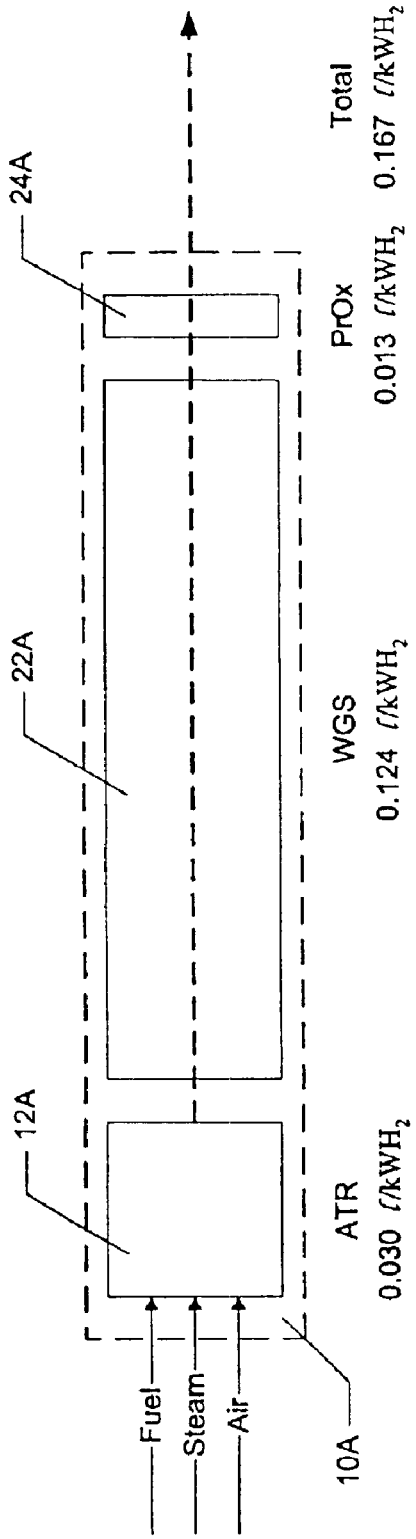
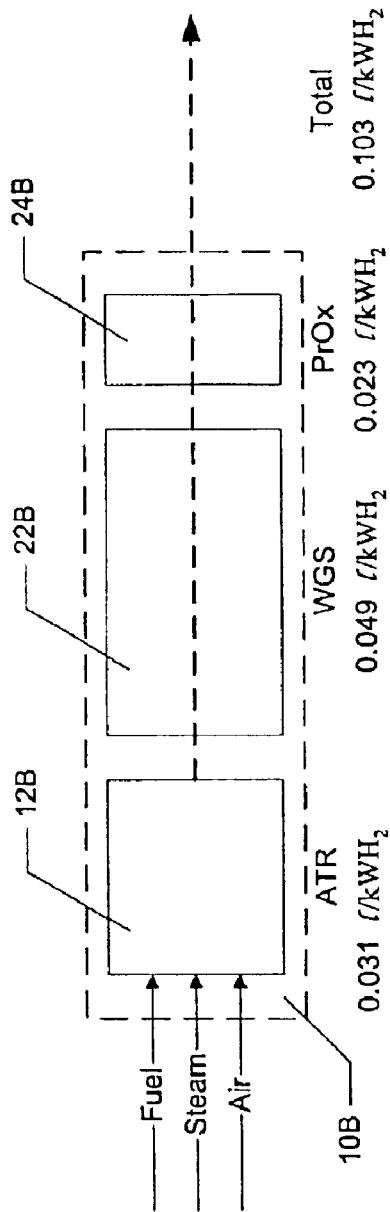
Figure 4A
Figure 4B

METHODS FOR REDUCING MASS AND VOLUME OF A FUEL PROCESSOR

FIELD OF THE INVENTION

The present invention relates generally to fuel cell systems and more particularly to methods for designing a fuel processor having a reduced size (i.e., the mass and volume) for a given fuel cell system application.

BACKGROUND OF THE INVENTION

Fuel cell systems have been proposed for use in electrical vehicular power plants to replace internal combustion engines. Such systems typically include a proton exchange membrane (PEM) type fuel cell in which hydrogen is supplied as the fuel to the anode and oxygen is supplied as the oxidant to the cathode of the fuel cell. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. These MEAs are relatively expensive to manufacture and require certain conditions, including proper water management and humidification and control of catalyst fouling constituents such as carbon monoxide (CO) for effective operation. A plurality of individual cells are commonly arranged in series together to form a fuel cell stack. Typical arrangements of multiple cells in a stack are described in U.S. Pat. No. 5,763,113, assigned to General Motors Corporation.

For vehicular applications, it may be desirable to use a liquid fuel such as a liquid hydrocarbon (e.g., methanol, ethanol or gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor typically contains multiple reactors wherein the fuel reacts with steam and air to yield a reformate gas comprising primarily hydrogen and carbon dioxide. A primary reactor is utilized to dissociate the hydrocarbon fuel into hydrogen, carbon dioxide, carbon monoxide, water and methane. Secondary or CO reduction reactors are used to reduce the CO levels in the reformate stream.

The feasibility of using a fuel cell system as a power source can depend on whether the size of the system is appropriate for a particular use. This is particularly so in vehicular applications, where the mass and volume of a vehicle directly influence its fuel efficiency and speed. Another factor affecting fuel cell system performance is the amount of water available within the system for input to reactions requiring water as a reactant. It is desirable to maintain a water-neutral fuel cell system and at the same time to provide enough water to support efficient fuel cell performance. Thus, steam to carbon (S/C) ratio is an important consideration in fuel processor design.

Fuel processors for a fuel cell system have heretofore been designed in the following manner. A fuel processor is typically designed with primary emphasis on operational efficiency at a maximum power operating point and secondary emphasis on other specifications such as turndown ratio, acceptable start-up duration, and transient performance. A maximum-power, steady-state flow mechanization is used to predict the carbon monoxide concentration of the primary reactor. The CO reduction reactors are then sized to reduce the carbon monoxide levels to a sufficiently high quality for the fuel cell stack at the maximum power operating point.

Since fuel processors for automotive applications are in an early state of development, no alternate design methods or strategies currently are known that utilize existing technology to optimize the size (i.e., mass and volume) of the fuel processor. Although a maximum-power steady-state flow mechanization currently is analyzed in the fuel processor design process, it would be desirable also to analyze fuel processor operation at a plurality of power levels and to configure a fuel processor for efficient performance for the power levels at which it operates most of the time.

SUMMARY OF THE INVENTION

The present invention provides a method for optimizing the size (i.e., mass and volume) of a fuel processor for use in a fuel cell system for providing electrical power in a plurality of power ranges. The method includes maximizing water availability in the fuel cell system to provide for peak system operational efficiency in a "most-used" power range, while sizing fuel processor components to achieve a maximum power level albeit at a less than optimal efficiency. The above method allows development of a fuel processor that has significantly lower total mass and volume and a shorter start-up time than conventionally-designed processors, but which can perform at a desired maximum power.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The various features, advantages and other uses of the present invention will become more apparent by referring to the following description and drawings in which:

FIG. 4A is a schematic representation of a fuel processor designed according to conventional fuel processor methodology; and FIG. 4B is a schematic representation of a fuel processor designed according to the principles of the present invention.

DETAILED DESCRIPTION OF THE PREFERRED EMBODIMENT

The following description of the preferred embodiment is merely exemplary in nature and is in no way intended to limit the invention, its application, or uses.

Figure 1:
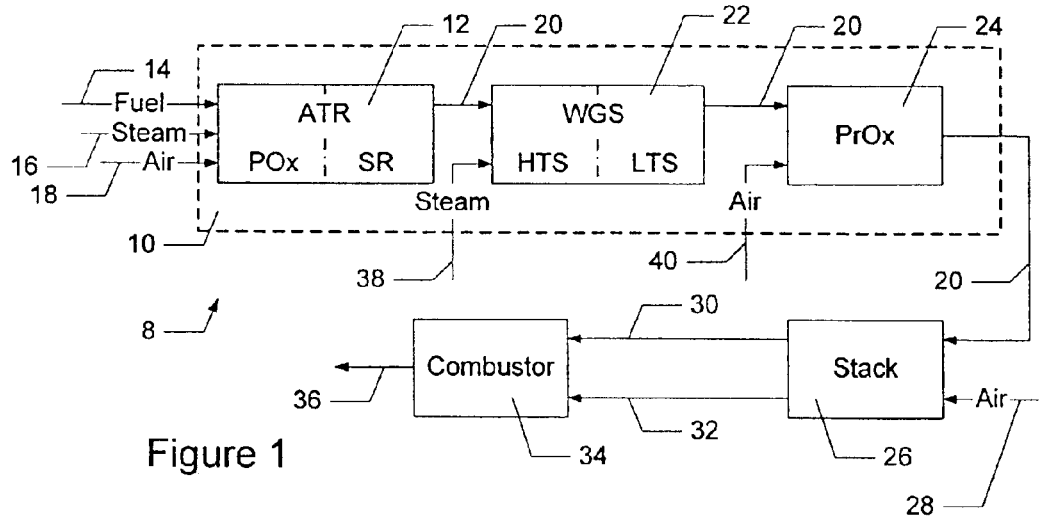
FIG. 1 is a simplified schematic diagram depicting a fuel cell system.

A fuel processor for converting hydrocarbons such as gasoline into a hydrogen-containing reformate stream for use by a fuel cell system is shown in FIG. 1. The present invention in one preferred embodiment is a method for optimizing the size (i.e., mass and volume) of a fuel processor for use in a fuel cell system. Accordingly, a fuel cell system 10 is shown in FIG. 1 for the purpose of teaching generally the various components of an exemplary fuel cell system. Although the embodiment of the present invention is described herein with reference to components of the fuel processor shown in FIG. 1, it should be understood that the invention is not limited by the components and/or arrangements of components shown in FIG. 1. Embodiments of the present invention can be used to design fuel processors having components and configurations that may differ from those shown in FIG. 1.

As shown in FIG. 1, a fuel cell system 8 includes a fuel processor 10 having a primary reactor 12 for catalytically reacting a reformable hydrocarbon fuel in the form of a fuel stream 14, water in the form of a steam stream 16 and air in the form of an air stream 18. The reformable hydrocarbon fuel in fuel stream 14 undergoes dissociation in the presence of steam in steam stream 16 and air in air stream 18 to produce the hydrogen-containing reformate which is exhausted from the primary reactor 12 in a reformats stream 20.

In the presently preferred embodiment, the primary reactor 12 takes the form of an autothermal reformer in which the fuel stream 14 and steam stream 16 are mixed with the air stream 18 and passed sequentially through two reactor sections—a partial oxidation (POx) section and a steam reforming (SR) section. POx implies predominantly reaction between fuel and air and SR implies predominantly reaction between fuel and water. However, it is to be understood that there is some overlap in the type of reactions occurring in the POx and SR sections which combine to perform as an autothermal reformer.

In an autothermal reformer, the predominantly POx reactions are exothermic and the predominantly SR reactions are endothermic, so that significantly all of the heat generated in the POx is carried into the SR. In the POx section, the fuel reacts exothermally with a sub-stoichiometric amount of air to produce carbon monoxide, hydrogen and lower hydrocarbons such as methane. The reaction in the POx section is typically fuel-rich. The hot POx reaction products, along with steam introduced with the fuel, pass into the SR section where the lower hydrocarbons react with steam to produce a reformate gas comprised principally of hydrogen, carbon dioxide, carbon monoxide, nitrogen, water, and methane. The steam reforming reaction is endothermic, and the heat required for this reaction is provided from the heat generated by the exothermic POx reaction and carried forward into the SR section by the POx effluent.

The fuel processor 10 also includes a water gas shift (WGS) reactor 22 and a preferential oxidation reactor (PrOx) 24 which are used to reduce the level of carbon monoxide in the reformate stream 20 to acceptable levels, for example, below 20 ppm. Reformate stream 20 enters the WGS reactor 22 and therein reacts with excess steam from steam stream 16 not consumed in the primary reactor 12. Optionally, additional steam may be added to the WGS 22 in the form of a steam stream 38 to produce carbon dioxide and hydrogen from the carbon monoxide and water. The WGS reactor 32 preferably includes a high temperature shift (HTS) section and a low temperature shift (LTS) section. The water gas shift reaction is conducted as a primary CO reduction to consume a substantial amount (to a level of about 0.5% to 1.0% on a molar basis) of the carbon monoxide in the reformate stream 20. Reformate stream 20 exits the WGS reactor 22 and enters the preferential oxidation (PrOx) reactor 24 where it is catalytically reacted with oxygen in the form of an air stream 40. The preferential oxidation reaction is conducted as a secondary CO reduction to consume essentially all of, or at least most of, the residual carbon monoxide (to a level less than 100 parts per million) without consuming excessive quantities of hydrogen.

The feed streams 14, 16, 18, 20, 28, 38, 40 of the various reactors and sections thereof may be conditioned (i.e., heated or cooled) via heat exchangers, water injection or other heat transfer means (not shown) to a suitable temperature based on the operational temperature of the specific component. Exemplary operational temperatures of the components of the fuel cell system can be found in the literature, and by way of background are provided in Table 1 below:

TABLE 1

| Component | Operational Temperature |
| --- | --- |
| ATR | 600° C.–1000° C. |
| WGS-HTS | 400° C.–550° C. |
| WGS-LTS | 200° C.–300° C. |
| PrOx | 150° C.–250° C. |
| Fuel Cell Stack | 75° C.–100° C. |

Air stream 28 is reacted in fuel cell stack 26 with reformate stream 20 exiting PrOx reactor 24. In fuel cell stack 26, the hydrogen in reformate stream 20 reacts with air stream 28 in an electrochemical reaction in the presence of the catalyst, whereby electrical energy is produced and water is generated as a by-product of the reaction. The reformate stream 20 enters the fuel cell stack 26 for reaction. Anode exhaust or effluent 30 from the anode side of the fuel cell stack 26 typically contains some unreacted hydrogen. Cathode exhaust or effluent 32 from the cathode side of the fuel cell 26 may contain some unreacted oxygen. These unreacted gases represent additional energy which can be recovered in a combustor 34, in the form of thermal energy, for various heat requirements within the fuel processor 10. Specifically, anode effluent 30 can be combusted, catalytically or thermally, in the combustor 34 with oxygen provided to the combustor 30 from the cathode effluent stream 32 depending on system operating conditions. The combustor 34 discharges an exhaust stream 36 to the environment and the heat generated thereby may be directed to the fuel processor 10 as needed.

The present invention is directed to a method for optimizing the size (i.e., mass and volume) of the fuel processor 10 for use in a fuel cell system 8 for providing electrical power in a plurality of power ranges. Although the present invention is described herein with respect to a vehicular application, it can be utilized for other applications, including stationary applications. The method includes maximizing water availability and thus the steam to carbon (S/C) ratio of the fuel processor 10 to provide for peak operational efficiency in a most-used power range, while sizing the individual components of the fuel processor 10 to achieve a desired maximum power. That is to say that the fuel processor maximizes the S/C ratio which thermally balances the most-used power range to optimize performance in that power range and to obtain low carbon monoxide levels from the WGS reactor 22.

Figure 2:
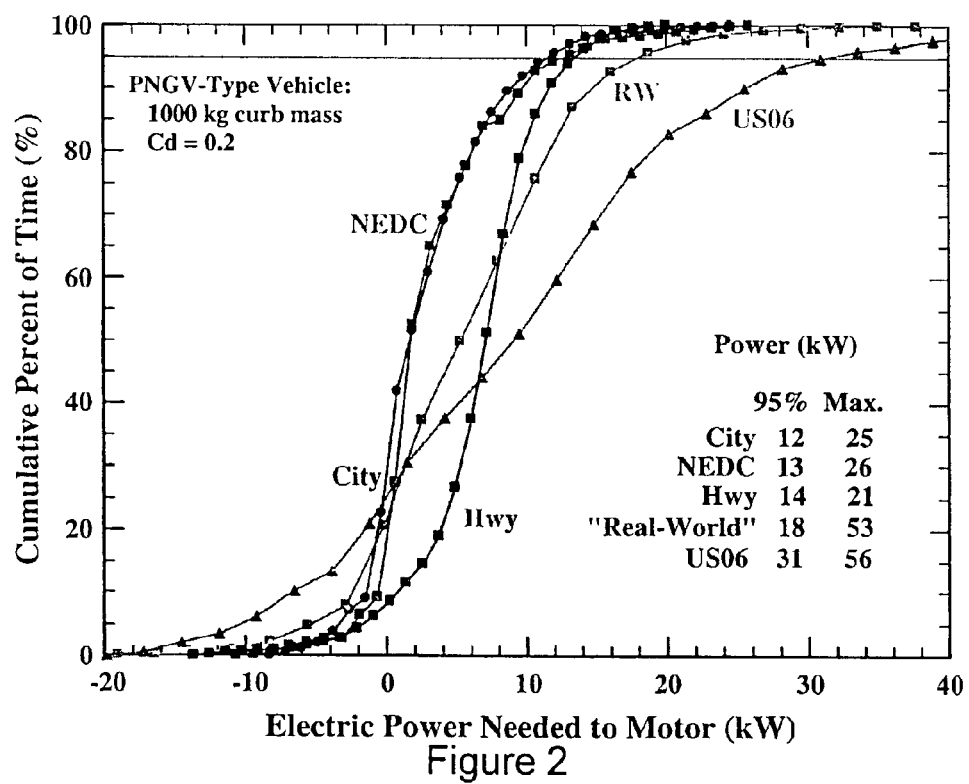
FIG. 2 is a graph of a distribution of power from a fuel cell system relative to cumulative percentage of time for a plurality of power level ranges in a vehicular application.

The method further includes determining power level ranges that the fuel cell system 8 is to provide, determining percentages of time during which the fuel cell system 8 is to provide power in each of the ranges, and determining the most-used power range from the ranges and the percentages. With reference to FIG. 2, a distribution of power from a fuel cell system relative to cumulative percentage of time is depicted for a plurality of drive cycles in a motor vehicle application. For purposes of illustration, the particular vehicle has a curb mass of 1000 kg and coefficient of drag, Cd=0.2. Five driving schedules are plotted including City, Highway, NEDC, US06 and "Real-World." The power demands in kilowatts as set forth in Table 2 can be evaluated from this data.

TABLE 2

| Component | MAX | 95% | 50% |
| --- | --- | --- | --- |
| CITY | 25 | 12 | 12.5 |
| HWY | 21 | 14 | 10.5 |
| NEDC | 26 | 13 | 13 |
| US06 | 53 | 18 | 26.5 |
| Real World | 56 | 31 | 28 |

It can be seen from this data that this particular motor vehicle spends at least 90% of the time operating at and below 50 percent of the required maximum power level. Thus, the efficiency of the fuel processor for this motor vehicle application may be optimized for operation at 50 percent power, while providing the fuel processor with a capacity to supply maximum power required by the application. Because the water gas shift reaction is kinetically limited, the WGS reactor 22 would be quite large if designed to run at full power with optimal fuel processor efficiency. Therefore, according to the present invention, an S/C ratio is optimized for operation at 50 percent or less, and the complete fuel processor system 10 is designed for mid-power peak efficiency.

Figure 3:
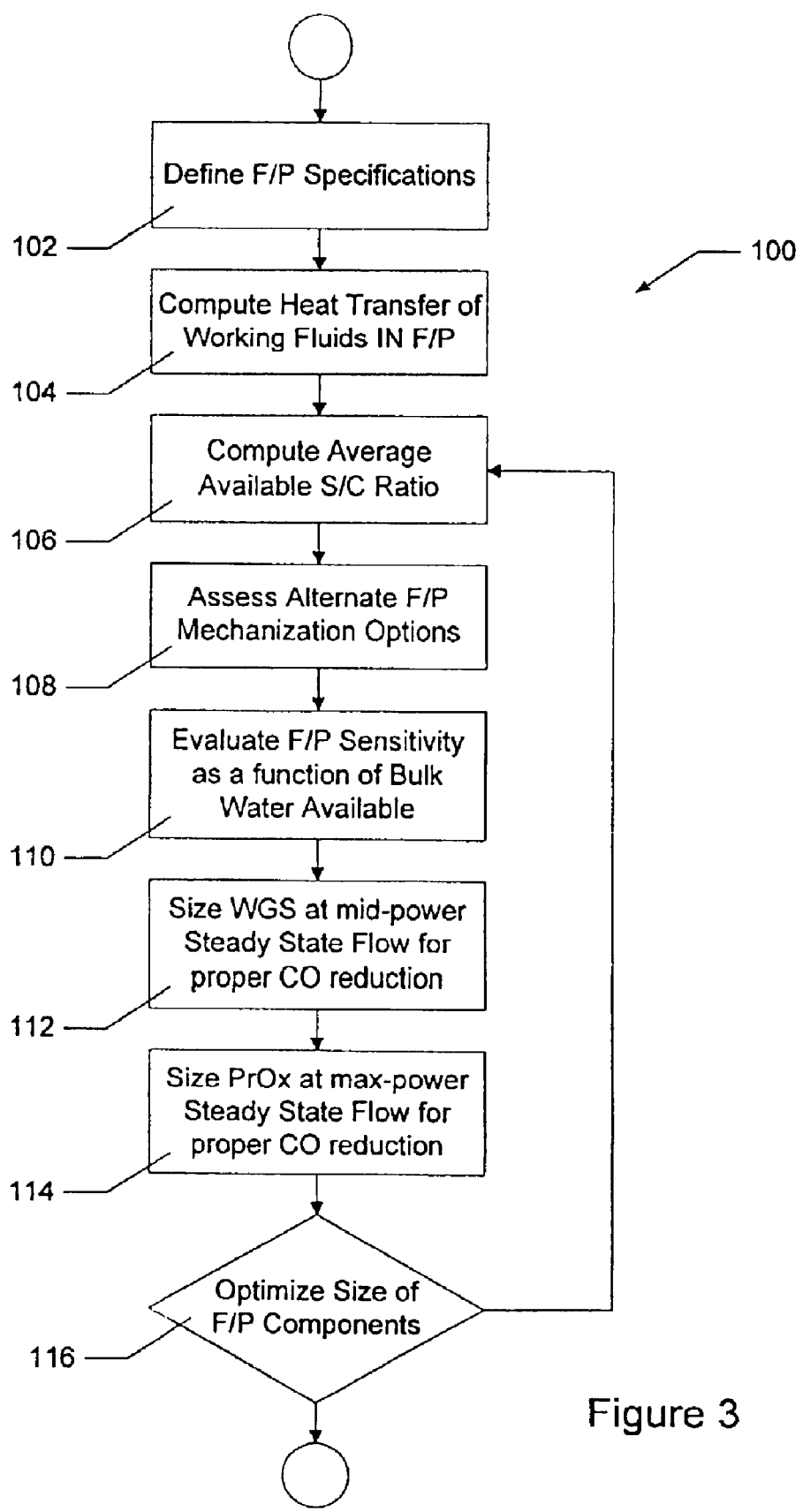
FIG. 3 is a flow chart of a design optimization method for reducing the size of a fuel processor according to a preferred embodiment of the present invention.

More specifically, volume and mass for a fuel processor are optimized according to steps shown in flow chart 100 of FIG. 3. Specifications for the fuel cell system application to be implemented are determined and analyzed at step 102. Such specifications include a maximum power level at which the system is to operate and a most-used power range for system operation as described above. Working fluids for heat transfer within the system also are analyzed at step 104. For proper reactor operation, heat must be removed from the reformate between the primary reactor 12 and WGS 22, and between the WGS 22 and the PrOx 24. To increase fuel processor efficiency, heat also needs to be added to the steam stream 16 and the air stream 18. These heat exchanges can be done in a variety of ways. Deciding the type of heat transfer fluid is an important initial step. Selecting an intermediate heat transfer working fluid such as oil provides flexibility in thermal control because the oil can be easily routed to each location. The oil flow rate can be controlled independently of the fuel processor process stream flows 14, 16, 18, 38, and 40. The oil, however, adds mass to the fuel processor which could delay the heat-up and therefore startup rate. Instead of using an intermediate fluid such as oil, one or more of the process fluids, such as the steam stream 16 and the air stream 18 could be used as the heat transfer fluid. This approach minimizes fuel processor mass, but makes thermal control more challenging since the flow rates of the process fluids are not independent but a function of the fuel processor operating condition.

An average S/C ratio anticipated to be available in the fuel cell system is computed at step 106. A presently preferred method for distributing water in a fuel cell system includes transporting water via a water transfer device as described in pending U.S. application Ser. No. 09/910,331 now U.S. Pat. No. 6,630,260 filed Jul. 20, 2001 which is commonly owned by the assignee of the present invention and the disclosure of which is expressly incorporated herein by reference herein. Alternately, variable pressure operation may be incorporated into the fuel cell system design to maximize water available while maintaining water neutrality of the system. A presently preferred method for variable pressure operation is described in pending U.S. application Ser. No. 09/584,210 now U.S. Pat. No. 6,815,106 filed May 31, 2000 which is commonly owned by the assignee of the present invention and the disclosure of which is expressly incorporated herein by reference herein. Fuel cell system mechanization options are analyzed at step 108. For example, in the above described motor vehicle application, steady-state modeling may be used to investigate steady-state flow mechanization options for fuel processor operation at selected power ranges in which the vehicle is anticipated to be operated.

The present embodiment will now be discussed with respect to analyzing one such option for fuel processor mechanization. For one of the mechanizations being analyzed for possible implementation, the sensitivity of the fuel processor 10 to bulk water availability during system operation in the most-used power range is analyzed at a step 110 to maximize the S/C ratio. For example, steam input may occur at multiple locations including steam stream 16 and steam stream 38. While not shown one skilled in the art will recognize that steam input may be provided incrementally within the primary reactor 12 or the WGS reactor, for example staged between the HTS and LTS sections of the WGS reactor 22. A sensitivity factor may be computed as a function of the input location and the input quantity in view of the bulk water anticipated to be available in the fuel cell system. In general, adding steam improves the performance (CO reduction ability) of either an HTS or LTS. Using chemical reactor modeling and testing, the optimum distribuiton of steam can be determined that will result in the lowest total mass and volume.

Based on the foregoing analysis, S/C ratios for the mechanization are optimized as described above with respect to step 106. The steady-state flow mechanization for the most-used power range is used to estimate the concentration of the carbon monoxide in the reformate stream 20 exiting the primary reactor 12 at step 112. The WGS reactor 22 is sized to reduce the carbon monoxide output concentration to a low level (e.g., between about 0.5 and 1.0 percent on a molar basis) in the most-used power range. Using the foregoing data, a mid-power or 50% power level would be used to size the WGS reactor for the automotive application described in FIG. 2. The mid-power steady-state flow mechanization again can be used, as previously described at step 110, to optimize the water distribution in the fuel cell system in the most-used power range.

The fuel processor mechanization is analyzed, at a step 114 to estimate the steady-state flow for a maximum power level at which the system is anticipated to operate. The maximum power mechanization is used to estimate the concentration of carbon monoxide in the reformate stream 20 exiting the WGS reactor 22. The PrOx reactor 26 is sized to reduce the carbon monoxide output concentration to less than 100 ppm. The foregoing steps are repeated at step 116 as desired, in varying order and frequency as desired, to optimize the size of the various fuel processor components which maximizes power efficiency in the most-used power range and that delivers stack-grade hydrogen sufficient to support system operation at the maximum power level. For example, an optimized fuel processor mechanization may be selected based on minimizing the total fuel processor volume or mass.

The foregoing method yields a fuel processor design that has a peak efficiency in a most-used power range. That is to that the fuel processor maximizes the S/C ratio which thermally balances the most-used power range to optimize performance in that power range and to obtain low carbon monoxide levels from the WGS reactor 22 for increased efficiency. Heat integration and a less-than-optimal S/C ratio will occur when the system operates at a maximum power level, thus resulting in a higher CO concentration from the WGS reactor 20 (on the order of about 1 to 2 molar percent). While the S/C ratio is not optimized at full power (that is, higher levels of S/C could be vaporized), the S/C ratio nevertheless is higher at full power than in a conventionally designed fuel processor system. A reduction in efficiency at full power is allowed, so that the S/C ratio can be reduced (for water neutrality) and so that the size of the WGS reactor 22 can be minimized. The PrOx reactor 24 is sized to consume carbon monoxide produced at full power and consequently configured to consume more hydrogen. Thus, a fuel processor 10 is provided that can operate at a desired full power level albeit at less than peak efficiency.

FIGS. 4A and 4B illustrate illustrate how implementing the foregoing method can result in a fuel processor design having reduced size (i.e., mass and volume). FIG. 4A illustrates a conventionally-designed fuel processor 10A, and FIG. 4B illustrates a fuel processor 10B designed in accordance with principles of the present invention. Although in FIG. 4B a more active catalyst is used than in FIG. 4A, the size of the primary reactor 12B is only slightly increased, approximately 0.001 liters per kilowatt $H_2$ (l/kWH$_2$) or on the order of approximately 3.33% larger, over that of primary reactor 12A. The size of the PrOx reactor 24B is significantly increased, approximately 0.0096 l/kWH$_2$ or on the order of approximately 71.6% larger, than the PrOx reactor 24A to support preferential oxidation at full power as a result of the increase in the carbon monoxide content from the WGS 22B. The size of the WGS reactor 22B, however, is significantly reduced, approximately 0.075 l/kWH$_2$ or on the order of approximately 60.5% smaller, than that of the WGS reactor 22A. Thus, the overall mass and volume of the fuel processor 10 is significantly reduced, approximately 0.0644 l/kWH$_2$ or on the order of approximately 38% smaller, as compared to fuel processor 10A.

Utilizing the method of the present invention typically increases the size of a primary reactor 12 and the PrOx reactor 24 combination by about 24.4% while decreasing the size of the WGS reactor 22 by about 60.5% over those implemented in conventionally-designed fuel processors. The size of fuel processors designed according to the above described method are at least about 30%, and typically about 35% to 45%, smaller than those of conventionally-designed fuel processors. Whereas a conventionally-designed fuel processor typically has a ratio of WGS reactor volume to total fuel processor volume ($V_{wgs}/V_{fp}$) of between about 65% and 85%, utilizing the above method can result in a fuel processor having a $V_{wgs}/V_{fp}$ ratio of between about 35% and 55%, and typically about 45%.

The present invention has been described in the context of a fuel processor for use in a fuel cell system for providing electrical power in a plurality of power ranges. However, one skilled in the art should recognize that the design methodology described herein has a broader range of application to fuel processor design in general. In the above-described embodiment, the most-used power range and the maximum power level are defined in terms of the electrical power demands of the fuel cell system. Since a precise correlation exists between the reactant gas flows and the power output for a given fuel cell (that is to say the electrochemical potential of the fuel cell), the operating range could be defined in terms of the power of the reactant gas, and thus sizing of the components of the fuel processor based upon a most-used power range and a maximum power level of the reactant gas.

The above description of the present invention is merely exemplary in nature and, thus, variations that do not depart from the gist of the invention are intended to be within the scope of the invention. Such variations are not to be regarded as a departure from the spirit and scope of the invention.

What is claimed is:

1. A method for optimizing the size of a fuel processor of the type having a primary reactor, a first CO reduction reactor and a second CO reduction reactor, the fuel processor being used with a fuel cell system, the method comprising the steps of:

determining a most-used power range from a plurality of power ranges of a fuel processor;

maximizing water availability in the fuel cell system at said most-used power range; and sizing said first CO reduction reactor to reduce carbon monoxide to a first predetermined level when said fuel processor operates in said most-used power range; and sizing said second CO reduction reactor to reduce said carbon monoxide concentration output by said first CO reduction reactor to less than a second predetermined level when said fuel processor operates at said a maximum power level.

2. The method of claim 1 wherein the step of sizing a first CO reduction reactor to reduce carbon monoxide to a first predetermined level comprises sizing the first CO reduction reactor to reduce carbon monoxide between 0.5 percent and 1.0 percent on a molar basis.

3. The method of claim 1 wherein the step of sizing a first CO reduction reactor comprises estimating a carbon monoxide output concentration for said primary reactor operated at said most-used power range.

4. The method of claim 1 wherein the step of maximizing water availability comprises the steps of:

computing a sensitivity factor as a function of a steam quantity and a plurality of steam input locations within said fuel processor; and adjusting a steam to carbon ratio in at least one of said plurality of steam input locations based on said sensitivity factor.

5. The method of claim 4 wherein adjusting a steam to carbon ratio in at least one of said plurality of steam input locations comprises maintaining a water-neutral condition in said fuel processor.

6. The method of claim 1 wherein the fuel cell system provides power to a motor vehicle and wherein said most-used power range is not greater than one-half said desired maximum power.

7. A method for optimizing the size a fuel processor for use in a fuel cell system providing electrical power in a plurality of power ranges, the method comprising the steps of:

determining a most-used power range from a plurality of power ranges of a fuel processor;

maximizing water availability in the fuel cell system at said most-used power range; and configuring said fuel processor for operation at a maximum power level and for operation at a peak efficiency in said most-used power range based on said maximized water availability.

8. The method of claim 7 wherein the step of maximizing water availability comprises the steps of:

computing a sensitivity factor as a function of a steam quantity and a plurality of steam input locations within said fuel processor; and adjusting a steam to carbon ratio in at least one of said plurality of steam input locations based on said sensitivity factor.

9. The method of claim 8 wherein said plurality of steam input locations include a primary reactor steam stream and a first CO reduction reactor steam stream.

10. The method of claim 9 wherein said first CO reduction reactor steam stream further includes a high temperature shift steam stream and a low temperature shift steam stream.

11. The method of claim 7 wherein maximizing water availability further comprises maintaining a water-neutral system.

12. The method of claim 7 further comprising the steps of:

estimating a plurality of power level ranges at which said fuel cell system operates;

estimating a time percentage for each of said plurality of power level ranges; and determining said most-used power range from said time percentage and said plurality of power level ranges.

13. The method of claim 7 wherein configuring fuel processor components comprises the steps of:

estimating a carbon monoxide concentration in a reformate stream of a primary reactor when said fuel processor operates at said most-used power range;

sizing a first CO reduction reactor to reduce said carbon monoxide concentration in said reformate stream of said primary reactor to a first predetermined level when said primary reactor operates in said most-used power range; and sizing a second CO reduction reactor to reduce said carbon monoxide concentration output in said reformate stream of said first CO reduction reactor to less than a second predetermined level when said primary reactor operates at said maximum power level.

14. The method of claim 13 wherein said first CO reduction reactor is sized to reduce said carbon monoxide output of said primary reactor to a concentration between 0.5 percent and 1.0 percent for the most-used power range.

15. The method of claim 14 wherein said second CO reduction reactor is sized to reduce said carbon monoxide output of said first CO reduction reactor to a concentration less than 100 parts per million for said maximum power level.

16. A method for optimizing the size of a fuel processor of the type having a primary reactor, a first CO reduction reactor and a second CO reduction reactor, the method comprising the step of:

(1) determining a maximum power level and a most-used power range from a plurality of power ranges of a fuel processor;

(2) computing a heat transfer parameter as a function of a working fluid in said fuel processor;

(3) computing an average available steam to carbon ratio for said fuel processor operating in said plurality of power ranges;

(4) selecting a fuel processor mechanization;

(5) evaluating a fuel processor sensitivity as a function of water availability of said fuel processor mechanization at said most-used power range; and (6) sizing said first CO reduction reactor to reduce carbon monoxide to a first predetermined level when said fuel processor operates in said most-used power range;

(7) sizing said second CO reduction reactor to reduce said carbon monoxide concentration output by said first CO reduction reactor to less than a second predetermined level when said fuel processor operates at said maximum power level;

(8) computing a fuel processor size parameter;

(9) repeating steps (4) through (8) for a plurality of fuel processor mechanizations; and

(10) selecting an optimized fuel processor mechanization from said plurality of fuel processor mechanizations based on said fuel processor size parameter.

17. The method of claim 16 wherein step (10) selects an optimized fuel processor mechanization having the smallest total fuel processor size.

18. A fuel cell system comprising:

a fuel cell operable to provide electrical power in a plurality of power ranges;

a fuel processor for providing hydrogen to said fuel cell, said fuel processor including:

a primary reactor reacting a fuel stream, a water stream and an air stream to generate a reformate stream having hydrogen and a first concentration of carbon monoxide;

a first CO reduction reactor in fluid communication with said primary reactor to react said reformate stream to reduce said first concentration of carbon monoxide in said reformate stream to a second concentration of carbon monoxide, said first CO reduction reactor being sized to operate at a peak efficiency in a most-used power range; and a second CO reduction reactor in fluid communication with said first CO reduction reactor to react said reformate stream to reduce said second concentration of carbon monoxide in said reformate stream to a third concentration of carbon monoxide, said second CO reduction reactor being sized to reduce said second concentration of carbon monoxide in said reformate stream to said third concentration of carbon monoxide when said fuel cell system is operated at a maximum power level.

19. The fuel cell system of claim 18 wherein the fuel processor comprises a ratio of first CO reduction reactor volume to total fuel processor volume of between about 35 percent and 55 percent.

20. The fuel cell system of claim 18 wherein the volume ratio is about 45 percent.

* * * * *